United States Patent
Sloan

(10) Patent No.: US 7,329,305 B2
(45) Date of Patent: Feb. 12, 2008

(54) MEMBRANE BASED DE-OXYGENATOR FOR PROCESS STREAMS

(75) Inventor: Michael A. Sloan, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 298 days.

(21) Appl. No.: 11/063,457

(22) Filed: Feb. 23, 2005

(65) Prior Publication Data

US 2006/0185510 A1 Aug. 24, 2006

(51) Int. Cl.
*B01D 19/00* (2006.01)
(52) U.S. Cl. .................................. 95/46; 96/6
(58) Field of Classification Search ............... 95/46, 95/54; 96/6, 7, 12
See application file for complete search history.

(56) References Cited

U.S. PATENT DOCUMENTS

| | | | | |
|---|---|---|---|---|
| 5,522,917 A | * | 6/1996 | Honda et al. ............ | 95/46 |
| 5,584,914 A | * | 12/1996 | Senoo et al. ............ | 96/6 |
| 6,315,815 B1 | * | 11/2001 | Spadaccini et al. ...... | 95/46 |
| 6,709,492 B1 | * | 3/2004 | Spadaccini et al. ...... | 96/6 |
| 2005/0204919 A1 | * | 9/2005 | Spadaccini et al. ...... | 96/4 |

FOREIGN PATENT DOCUMENTS

| | | |
|---|---|---|
| DE | 102 46 508 | 1/2004 |
| EP | 1 464 376 | 10/2004 |
| EP | 1 579 901 | 9/2005 |

OTHER PUBLICATIONS

European Search Report dated Mar. 13, 2006.

* cited by examiner

*Primary Examiner*—Duane Smith
*Assistant Examiner*—Douglas J Theisen
(74) *Attorney, Agent, or Firm*—Carlson, Gaskey & Olds

(57) ABSTRACT

An example system for processing a material stream includes a deoxygenator for removing dissolved oxygen. Removal of dissolved oxygen provides for the reduction of reactions and processes that can result in the generation of undesirable insoluble materials that can clog or otherwise foul the system. The deoxygenator includes an oxygen permeable membrane to remove dissolved oxygen from the flowing material stream. Because dissolved oxygen can be removed from the material stream essentially without disrupting flow, there is little affect on the overall process. The removal of dissolved oxygen provides significant increases in process efficiencies by reducing or eliminating the formation of undesirable by products within a material stream.

17 Claims, 2 Drawing Sheets

MEMBRANE BASED DE-OXYGENATOR FOR PROCESS STREAMS

BACKGROUND OF THE INVENTION

This application relates generally to improving processes involving hydrocarbon or oxygenate streams. More particularly, this application relates to a method and device for removing oxygen from hydrocarbon and other oxygenated streams to improve processing efficiencies.

Production of many products involves processing of a continuous flowing stream of gas or liquid. For example petroleum products are produced by separating and refining specific desirable elements from a stream of crude oil. In many instances the efficiency of such processes is determined in part by the amount of by-products that are produced. Undesired by-product generation such as for example the formation of coke or insoluble materials on valves, conduits and other flow control devices can hinder process efficiency. Typically, a process is modified and optimized to lessen the effects and creation of these by-products. Many undesirable by-products result from reactions and conversions caused by an abundance of dissolved oxygen within the gas or liquid. In some instances, anti-oxidants are added to the gas or liquid to inhibit the formation of these unwanted by-products.

Some processes include a heating step in which a gas or liquid is heated to create or aid chemical reactions desirable for the specific process. It is known that heating a hydrocarbon or oxygenate stream can cause undesirable formation of insoluble material by-products that can coat and clog fixtures and inner surfaces of conduits utilized to transport the process stream. The resulting gumming, coking and fouling can reduce process efficiencies. For this reason, processes are modified to operate at reduced temperatures to prevent the formation of these undesirable materials. Increasing process efficiency is often determined by the sustainable temperatures at which the process can be performed. Disadvantageously, the same temperatures or conditions that would provide the greatest efficiency are also the conditions in which dissolved oxygen within the stream contribute to the generation of undesirable by-products.

Accordingly, it is desirable to develop a method and device from removing dissolved oxygen from a process stream to improve sustainable processing conditions.

SUMMARY OF THE INVENTION

An example system according to this invention provides for process improvement by removing dissolved oxygen with a deoxygenator.

An example system according to this invention includes a deoxygenator for removing dissolved oxygen from a material stream. The material stream may consist of any material in liquid, gas or combined forms that are processed as a constantly flowing stream. Removal of dissolved oxygen is particularly useful for hydrocarbon or oxygenate streams. Removal of dissolved oxygen provides for the reduction of reactions and processes that can result in the generation of undesirable insoluble materials that can clog or otherwise foul the system.

The deoxygenator includes an oxygen permeable membrane to remove dissolved oxygen from the flowing material stream. Because dissolved oxygen can be removed from the material stream essentially without disrupting flow, there is little affect on the overall process. The deoxygenator provides for the continuous operation of the system while removing dissolved oxygen.

Accordingly, the deoxygenator of this invention utilized in the example system provides significant increases in process efficiencies by reducing or eliminating the dissolved oxygen content within a material stream.

These and other features of the present invention can be best understood from the following specification and drawings, the following of which is a brief description.

DETAILED DESCRIPTION OF THE PREFERRED EMBODIMENT

Figure 1:
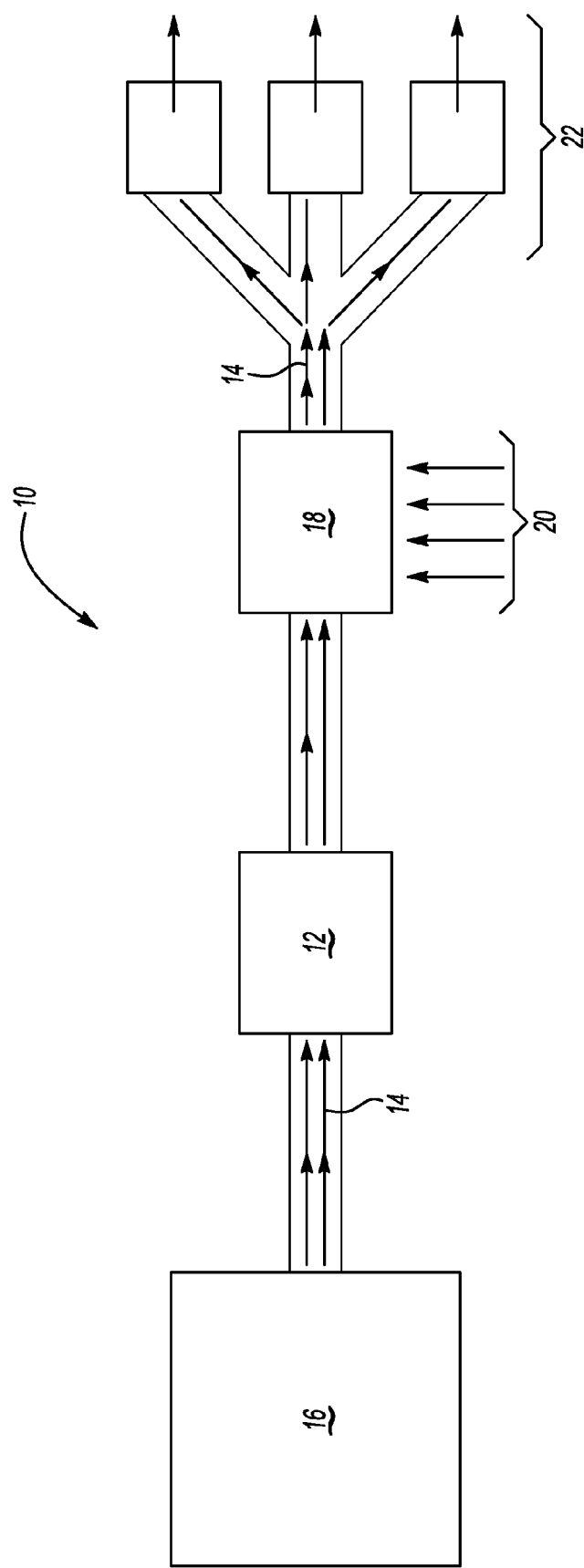
FIG. 1 is a schematic view of a system for removing oxygen from a material stream.

Referring to FIG. 1, a system for processing a stream is generally indicated at 10 and includes a deoxygenator 12 for removing dissolved oxygen from a material stream 14. The example illustrated in FIG. 1 includes a storage tank 16 supplying the material stream 14 through the deoxygenator 12. The material stream 14 may consist of any material in liquid, gas or combined forms that are processed as a constantly flowing stream. Removal of dissolved oxygen is particularly useful for material streams that consisting of a hydrocarbon or oxygenate stream. The deoxygenator 12 includes an oxygen permeable membrane to remove dissolved oxygen from the flowing material stream 14. Because dissolved oxygen can be removed from the material stream 14 essentially without disrupting flow, there is little affect on the overall process.

The example system 10 includes a heat exchanger 18 where heat from a heat source 20 is applied to the material stream 14. Heat is applied to the material stream 14 after the dissolved oxygen is removed within the deoxygenator 12. Heating a material stream 14 including hydrocarbons or oxygenates in the presence of dissolved oxygen can cause undesirable affects such as the formation of insoluble by-products that foul system components and cause formation of peroxides and other products of oxidation. Accordingly, removing oxygen from the material stream 14 prior to any substantial heating can substantially eliminate the production of undesirable by-products. As appreciated, the level of oxygen removal will depend on the application specific process requirements.

The example system 10 also includes a plurality of process stations 22. The process stations 22 provide for the further processing and alteration of the material stream 14. Once dissolved oxygen has been removed from the material stream 14, additional processes can be carried out without the detrimental side effects that often accompany excessive dissolved oxygen content. The process stations 22 can include the separation of component parts of the material stream 14 such as is in an oil refining process. Further, the process stations 22 may include additions to the material stream 14 to change the composition and characteristics of the material stream 14. The process stations 22 perform the subsequent alteration to the material stream 14 in an improved manner due to the substantial absence of dissolved oxygen provided by the deoxygenator 12.

Once the material stream 14 exits the deoxygenator 12, a substantial portion of dissolved oxygen is removed. Preferably, the amount of dissolved oxygen remaining within the material stream 14 exiting the deoxygenator 12 is less than 10 parts per million (ppm) and preferably less than 2 ppm. As should be understood, the specific amount of oxygen removal from the material stream 14 will depend on application specific requirements. A processes efficiency may be greatly improved by smaller reduction in the amount of dissolved oxygen, where other processes may require the substantial elimination of dissolved oxygen to attain a desired efficiency.

The system 10 includes the step of heating the now substantially oxygen free material stream 14. Removal of dissolved oxygen from the material stream 14 removes a prominent catalyst for the generation and production of undesirable by-products. Accordingly, the heat exchanger 18 may heat the material stream 14 to increased temperatures. The material stream 14 can therefore continue processing without accommodations for insoluble materials. Accordingly, the material stream 14 can be heated to higher temperatures, and flowed at a greater rate because of the removal of the detrimental effects caused by creation of such insoluble materials.

Figure 2:
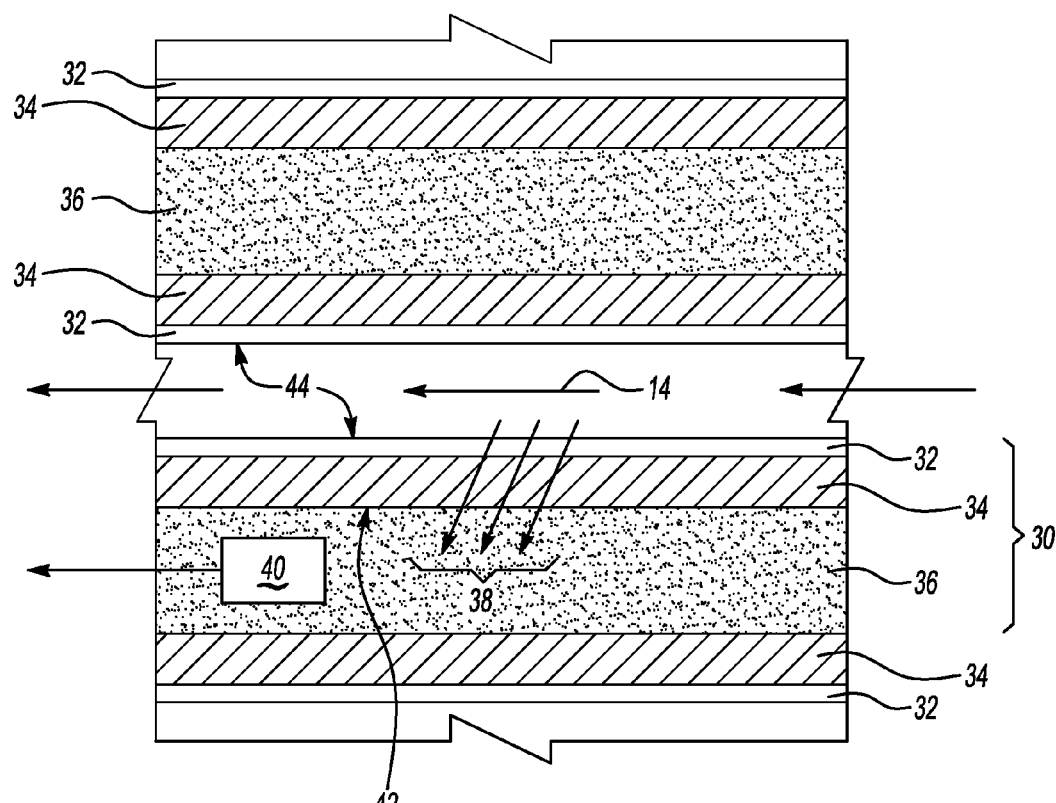
FIG. 2 is a cross-section view of a permeable membrane according to this invention.

Referring to FIG. 2, the deoxygenator 12 provides for the removal of dissolved oxygen through the use of a composite permeable membrane 30 that is shown schematically in cross-section. The permeable membrane 30 includes a permeable layer 32 disposed over a porous backing 34. The porous backing 34 provides the required support structure for the permeable layer 32 while still allowing maximum oxygen diffusion from the material stream 14. The permeable layer 32 is coated on to the porous backing 34 and a mechanical bond between the two is formed. The permeable layer 32 is preferably a 0.5-20 µm thick coating of polytetrafluoroethylene such TEFLON AF 2400 over a 0.005-in thick porous backing 34 of polyvinylidene fluoride (PVDF) with a 0.25 µm pores size. Other supports of different material, thickness and pore size can be used that provide the requisite strength and openness.

The example permeable layer 32 is Dupont TEFLON AF amorphous fluoropolymer or another polytetrafuoroethlene, however other materials known to workers skilled in the art are within the contemplation of this invention, such as Solvay Hyflon AD perfluorinated glassy polymer and Asahi Glass CYTOP polyperfluorobutenyl vinyl ether. Each composite permeable membrane 30 is supported on a porous substrate 36. The porous substrate 36 is in communication with a vacuum source 40 to create an oxygen partial pressure differential across the composite permeable membrane 30.

In operation a partial pressure differential is created by the vacuum source 40 between a non-material stream side 42 of the permeable membrane 30 and a material stream side 44. Oxygen indicated at arrows 38 diffuses from the material stream 14 across the composite permeable membrane 30 and into the porous substrate 36. From the porous substrate 36 the oxygen 38 is vented out of the system 10 and away from the materials stream 14.

Figure 3:
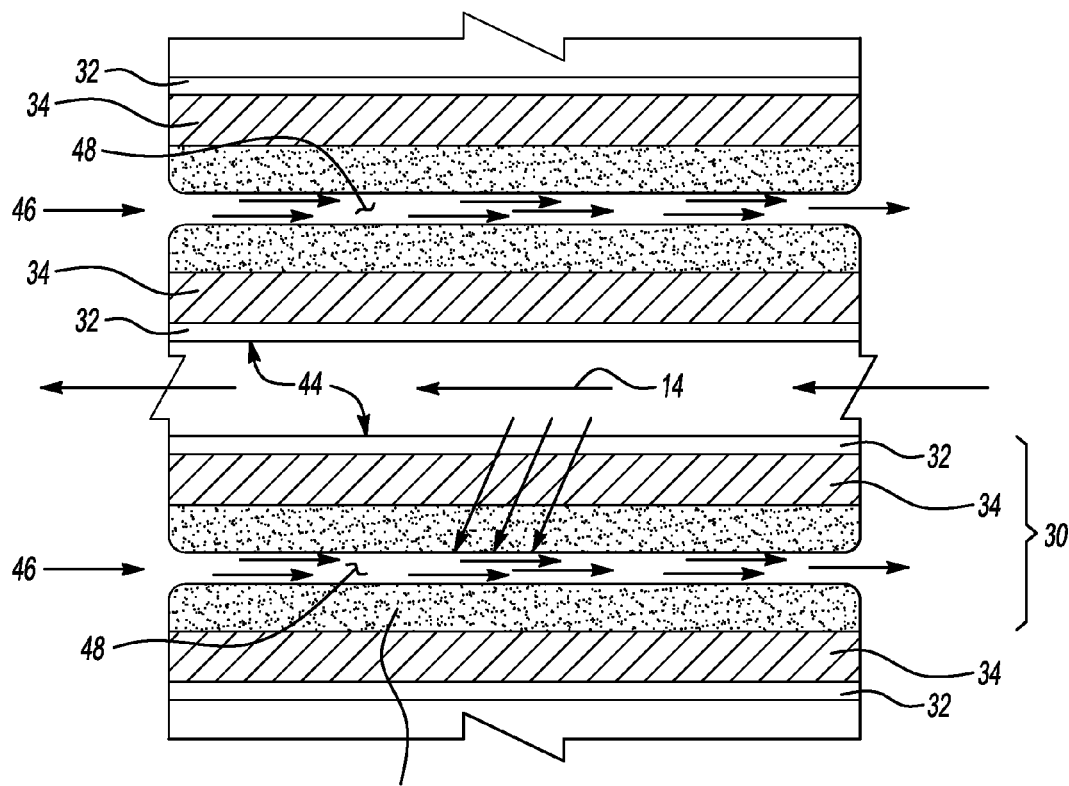
FIG. 3 is a cross-sectional view of an example permeable membrane with a strip gas passage.

Referring to FIG. 3, a strip gas 46 may also be flowed within a passage 48 adjacent the non-material stream side 42 of the permeable membrane 30 to generate the desired partial oxygen pressure differential. The non-material stream side 42 of the permeable membrane 30 is supported by the porous backing 34 and the strip gas 46 can also be flowed adjacent the porous backing 34.

Further, referring to FIGS. 2 and 3, the oxygen partial pressure differential can be varied by varying the vacuum source 40 or by varying the flow of strip gas. The oxygen partial pressure differential across the oxygen permeable membrane 30 can be varied responsive to changes in the material stream flow rates, or other the amount of dissolved oxygen within the material stream.

The deoxygenator 12 provides for the continuous operation of the system 10 while removing dissolved oxygen. Further, by removing the dissolved oxygen additional components are not required for counteracting and preventing the effects and production of undesirable by-products. The example system 10 may represent any process ranging form the refining of crude oil into useable petroleum products to the treatment of food products for large scale production facilities. As appreciated, food products may have a limited useable shelf life due to the formation of undesirable elements encouraged and worsened by the dissolved oxygen contained therein. For this reason, the removal of dissolved oxygen provides an increase in useable life.

Accordingly, the deoxygenator 12 of this invention utilized in the example system 10 provides significant increases in process efficiencies by reducing or eliminating the dissolved oxygen content within a material stream. Further, the deoxygenator of this system 10 can provide an increased useable life for material streams comprising elements for consumption.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of removing oxygen from a material stream utilized in producing a final product comprising the steps of:
    a) flowing the material stream adjacent an oxygen permeable membrane;
    b) drawing oxygen from said material stream through the oxygen permeable membrane with a partial oxygen pressure differential across the permeable membrane, wherein the permeable membrane comprises a polytetrafluoroethylene coating disposed on a porous substrate;
    c) heating the material stream after removal of dissolved oxygen; and
    d) processing the material including altering a composition of the material stream.

2. The method as recited in claim 1, wherein said step c) comprises heating said material stream to a temperature greater than a portion of the material stream prior to flowing through the deoxygenator.

3. The method as recited in claim 1, wherein said step d) comprises adding an additional component to the material stream.

4. The method as recited in claim 1, wherein said step d) comprises separating components of the material stream.

5. The method as recited in claim 1, wherein said material stream comprises hydrocarbons.

6. The method as recited in claim 5, wherein said material stream comprises liquid petroleum.

7. The method as recited in claim 1, wherein said material stream comprises a product for human consumption.

8. The method as recited in claim 1, comprising applying a vacuum adjacent the oxygen permeable membrane for generating the partial oxygen pressure differential.

9. The method as recited in claim 1, comprising flowing a strip gas adjacent the oxygen permeable membrane for generating the partial oxygen pressure differential.

10. The method as recited in claim 1, comprising varying the partial oxygen pressure differential across the oxygen permeable membrane responsive to changes in a flow rate of said material stream.

11. A system for processing a material stream utilized in producing a final product comprising:
- a conduit within which the material stream flows in a substantially continuous manner during processing;
- a deoxygenator for removing dissolved oxygen from the material stream in a continuous manner, wherein the deoxygenator comprises a polytetrafluoroethylene coating disposed on a porous substrate;
- a first process station disposed after the deoxygenator; and
- a second process station disposed after the first process station for altering a characteristic of said material stream.

12. The system as recited in claim 11, wherein said second process station includes a means for altering a characteristic of the material stream such that said material stream exiting said second process station is different than said material stream exiting said deoxygenator.

13. The system as recited in claim 11, wherein said first process station is a heat exchanger for heating said material stream to a temperature greater than a portion of the material stream prior to flowing through the deoxygenator.

14. The system as recited in claim 11, wherein said second process station includes a means for adding an additional component to said material stream.

15. The system as recited in claim 11, wherein said second process station includes a means for separating components of said material stream.

16. The system as recited in claim 11, comprising a vacuum source in communication with said porous substrate for creating a partial oxygen pressure differential across said permeable membrane for removing dissolved oxygen from said material stream.

17. The system as recited in claim 11, comprising a strip gas passage in communication with said porous substrate for creating a partial pressure differential across said permeable membrane for removing dissolved oxygen from said material stream.

* * * * *